United States Patent
Lim et al.

(10) Patent No.: US 8,253,918 B2
(45) Date of Patent: Aug. 28, 2012

(54) ARRAY SUBSTRATE FOR IN-PLANE SWITCHING MODE LIQUID CRYSTAL DISPLAY DEVICE INCLUDING PIXEL AND COMMON ELECTRODES ON THE SAME LAYER AND METHOD OF MANUFACTURING THE SAME

(75) Inventors: Byoung-Ho Lim, Gumi-si (KR); Hyun-Kyu Lee, Seoul (KR); Do-Sung Kim, Gumi-si (KR); Byung-Koo Kang, Gumi-si (KR); Do-Young Lee, Seoul (KR); Eui-Tae Kim, Seoul (KR); Sang-Wook Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/364,884

(22) Filed: Feb. 2, 2012

(65) Prior Publication Data

US 2012/0135552 A1    May 31, 2012

Related U.S. Application Data

(62) Division of application No. 11/646,668, filed on Dec. 28, 2006, now Pat. No. 8,130,351.

(30) Foreign Application Priority Data

Dec. 29, 2005    (KR) .............................. 2005-0133554

(51) Int. Cl.
*G02F 1/1343* (2006.01)
*G02F 1/13* (2006.01)
(52) U.S. Cl. ........................ 349/187; 349/141
(58) Field of Classification Search .................. 349/141, 349/187
See application file for complete search history.

(56) References Cited

U.S. PATENT DOCUMENTS

| | | |
|---|---|---|
| 6,177,970 B1 | 1/2001 | Kim |
| 6,281,958 B1 | 8/2001 | Nakajima |
| 6,680,772 B2 | 1/2004 | Lee |
| 2002/0008827 A1 | 1/2002 | Yoo et al. |
| 2005/0093029 A1 | 5/2005 | Kim et al. |
| 2005/0099568 A1 | 5/2005 | Kim et al. |
| 2005/0243228 A1 | 11/2005 | Lee et al. |
| 2007/0146605 A1 | 6/2007 | Park et al. |
| 2007/0153201 A1 | 7/2007 | Lee et al. |

FOREIGN PATENT DOCUMENTS

| | | |
|---|---|---|
| CN | 1607424 A | 4/2005 |
| CN | 1667477 A | 9/2005 |
| CN | 1702534 A | 11/2005 |
| KR | 10-2005-087552 | 8/2005 |

OTHER PUBLICATIONS

Office Action issued in corresponding Chinese Patent Application No. 20060168053X, issued Jul. 4, 2008. First Office Action issued in corresponding Chinese Patent Application No. 200610168053X, issued Jan. 18, 2008.
Office Action dated Oct. 24, 2008 for Chinese Patent Application No. 200610168053X.

*Primary Examiner* — Mark Robinson
*Assistant Examiner* — Michael Inadomi
(74) *Attorney, Agent, or Firm* — Brinks Hofer Gilson & Lione

(57) ABSTRACT

An array substrate for an in-plane switching mode liquid crystal display device includes a substrate, a gate line along a first direction on the substrate, a data line along a second direction and crossing the gate line to define a pixel region, a common line on the substrate, a thin film transistor connected to the gate and data lines, a pixel electrode in the pixel region and connected to the thin film transistor, the pixel electrode including horizontal parts along the first direction, and a common electrode in the pixel region and connected to the common line, the common electrode including horizontal portions along the first direction, wherein the pixel electrode and the common electrode are formed on a same layer.

11 Claims, 15 Drawing Sheets

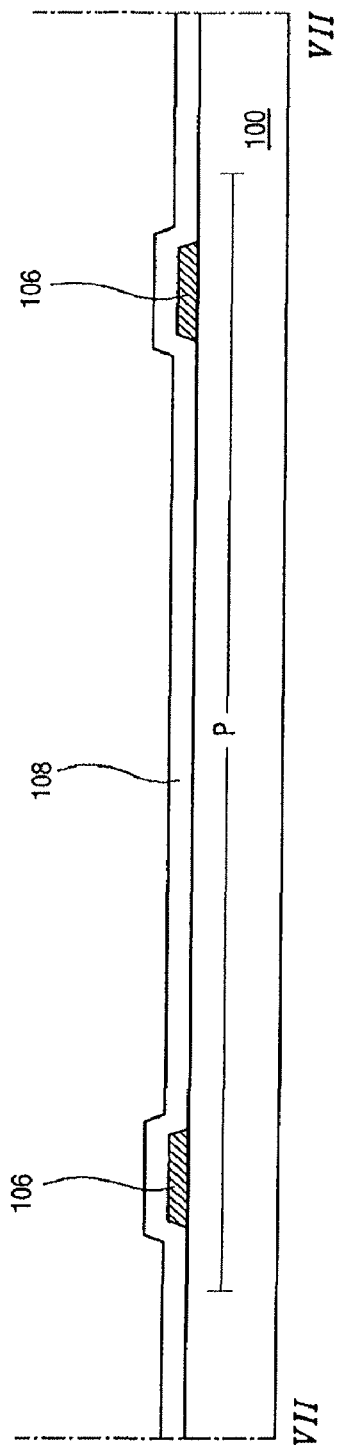
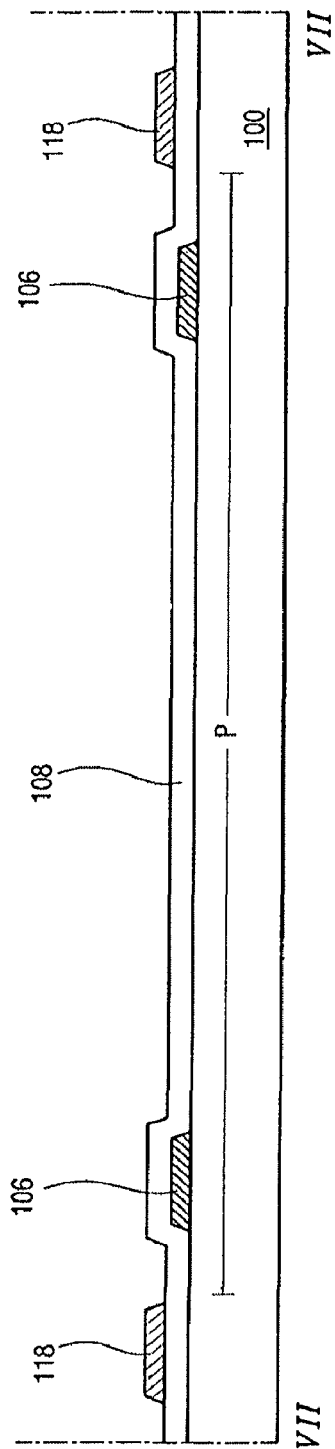
FIG. 7A
FIG. 7B

ARRAY SUBSTRATE FOR IN-PLANE SWITCHING MODE LIQUID CRYSTAL DISPLAY DEVICE INCLUDING PIXEL AND COMMON ELECTRODES ON THE SAME LAYER AND METHOD OF MANUFACTURING THE SAME

The present patent document is a divisional of U.S. patent application Ser. No. 11/646,668, filed Dec. 28, 2006, which claims priority to Korean Patent Application No. 2005-0133554 filed in Korea on Dec. 29, 2005, which is hereby incorporated by reference.

BACKGROUND

1. Field of the Invention

The present invention relates to a liquid crystal display device, and more particularly, to an array substrate for an in-plane switching (IPS) mode liquid crystal display (LCD) device and a method of manufacturing the same.

2. Discussion of the Related Art

Liquid crystal display ("LCD") devices are driven based on electro-optical characteristics of a liquid crystal material. The liquid crystal material has an intermediate state between a solid crystal and an isotropic liquid. The liquid crystal material is fluid like the isotropic liquid, and molecules of the liquid crystal material are regularly arranged like the solid crystal. An alignment direction of the liquid crystal molecules depends on the intensity or the direction of an electric field applied to the liquid crystal molecules. Light passes through the LCD device along the alignment direction of the liquid crystal molecules. By controlling the intensity or the direction of the electric field, the alignment direction of the liquid crystal molecules changes, and images are displayed.

Active matrix liquid crystal display ("AMLCD") devices, which include thin film transistors as switching devices for a plurality of pixels, have been widely used due to their high resolution and ability to display fast moving images.

Generally, an LCD device includes two substrates, which are spaced apart and facing each other, and a liquid crystal layer interposed between the two substrates. Each of the substrates includes an electrode. The electrodes from respective substrates face one the other. An electric field is induced between the electrodes by applying a voltage to each electrode. The alignment direction of liquid crystal molecules changes in accordance with a variation in the intensity or the direction of the electric field. The direction of the electric field is perpendicular to the substrates. The LCD device has relatively high transmittance and a large aperture ratio.

However, the LCD device has narrow viewing angles. To increase the viewing angles, various modes have been proposed. Among these modes, an IPS mode of the related art will be described with reference to accompanying drawings.

FIG. 1 is a schematic cross-sectional view of an IPS mode LCD device according to the related art.

In FIG. 1, the IPS mode LCD device according to the related art includes a lower substrate 10 and an upper substrate 40, and a liquid crystal layer LC is interposed between the lower substrate 10 and the upper substrate 40.

A thin film transistor T, a common electrode 18 and a pixel electrode 30 are formed at each pixel P on the lower substrate 10. The thin film transistor T includes a gate electrode 14, a semiconductor layer 22, and source and drain electrodes 24 and 26. The semiconductor layer 22 is disposed over the gate electrode 14 with a gate insulating layer 20 therebetween. The source and drain electrodes 24 and 26 are formed on the semiconductor layer 22 and are spaced apart from each other.

The common electrode 18 includes a plurality of portions, and the pixel electrode 30 includes a plurality of parts. The portions of the common electrode 18 and the parts of the pixel electrode 30 are parallel to and spaced apart from each other on the lower substrate 10. The common electrode 18 may be formed of the same material and in the same layer as the gate electrode 14. The pixel electrode 30 may be formed of the same material and in the same layer as the source and drain electrodes 24 and 26.

Although not shown in the figure, a gate line is formed along a first side of the pixel P, and a data line is formed along a second side of the pixel P perpendicular to the first side. A common line is further formed on the lower substrate 10. The common line provides the common electrode 18 with a voltage.

A black matrix 42 and a color filter layer 44 are formed on an inner surface of the upper substrate 40. The black matrix 42 is disposed over the gate line, the data line and the thin film transistor T. The color filter layer 44 is disposed at the pixel P.

Liquid crystal molecules of the liquid crystal layer LC are driven by a horizontal electric field 35 induced between the common electrode 18 and the pixel electrodes 30.

The lower substrate 10 including the thin film transistor T, the common electrode 18 and the pixel electrode 30 may be referred to as an array substrate. The upper substrate 40 including the black matrix 42 and the color filter layer 44 may be referred to as a color filter substrate.

FIG. 2 is a schematic plan view of an array substrate for an IPS mode LCD device according to the related art.

In FIG. 2, a gate line 12 is formed on a substrate 10, and a data line 28 crosses the gate line 12 to define a pixel region P. A common line 16 is parallel to and spaced apart from the gate line 12. The common line 16 goes across the pixel region P. A thin film transistor T is formed at a crossing point of the gate line 12 and the data line 28. The thin film transistor T includes a gate electrode 14, a semiconductor layer 22, and source and drain electrodes 24 and 26. The gate electrode 14 is connected to the gate line 12. The semiconductor layer 22 is disposed over the gate electrode 14. The source and drain electrodes 24 and 26 are disposed on the semiconductor layer 22 and are spaced apart from each other.

A common electrode 18 extends from the common line 16 and is formed in the pixel region P. The common electrode 18 includes a plurality of portions, which are parallel to and spaced apart from each other. A pixel electrode 30 is formed in the pixel region P. The pixel electrode 30 includes a plurality of parts, which are parallel to and alternate with the portions of the common electrode 18.

An IPS mode LCD device having the array substrate of the above-mentioned structure has relatively wide viewing angles in a left-right direction with respect to the device, but still has narrow viewing angles in an up-down direction or a diagonal direction with respect to the device.

To increase the viewing angles in the up-down or diagonal direction, another structure has been proposed.

FIG. 3 is a plan view of an array substrate for an IPS mode LCD device according to another embodiment of the related art.

In FIG. 3, a gate line 52 is formed along a first direction on a substrate 50. A data line 66 is formed along a second direction. The data line 66 crosses the gate line 52 to define a pixel region P. A thin film transistor T is formed at a crossing point of the gate and data lines 52 and 66. A common electrode 56 and a pixel electrode 72 are formed in the pixel region P.

The thin film transistor T includes a gate electrode 54, an active layer 60, a source electrode 62 and a drain electrode 64.

The gate electrode 54 is connected to the gate line 52. The active layer 60 is formed over the gate electrode 54 with a gate insulating layer (not shown) therebetween. The source and drain electrodes 62 and 64 are spaced apart from each other over the active layer 60. The source electrode 62 is connected to the data line 66.

The common electrode 56 is formed of the same material and in the same layer as the gate line 52. The gate insulating layer (not shown) and a passivation layer (not shown) are formed between the common electrode 56 and the pixel electrode 72 to prevent the pixel electrode 72 from contacting the common electrode 56. The pixel electrode 72 is formed of a transparent conductive material to increase an aperture ratio. The pixel electrode 72 may be formed of the same material and in the same layer as the source and drain electrodes 62 and 64.

The common electrode 56 includes horizontal portions 56a, a first vertical portion 56b and a second vertical portion 56c. The horizontal portions 56a are formed along the first direction and are spaced apart from each other. The first vertical portion 56b is connected to one ends of the horizontal portions 56a, and the second vertical portion 56c is connected to the other ends of the horizontal portions 56a. The pixel electrode 72 includes horizontal parts 72a, a first vertical part 72b, and a second vertical part 72c. The horizontal parts 72a are formed along the first direction and alternate with the horizontal portions 56a. The first vertical part 72b is connected to one ends of the horizontal parts 72a, and the second vertical part 72c is connected to the other ends of the horizontal parts 72a.

Since the common electrode 56 and the pixel electrode 72 are arranged along the first direction, that is, substantially horizontally, the viewing angles are increased in the up-down direction. If the common and pixel electrodes 56 and 72 are inclined with a predetermined angle with respect to the first direction, the viewing angles may be increased in the diagonal direction.

However, the common electrode 56 and the pixel electrode 72 are formed in difference layers, and the common electrode 56 and the pixel electrode 72 may be misaligned during respective processes. The misalignment lowers image qualities of the device.

FIG. 4 is a cross-sectional view of an array substrate for an IPS mode LCD device according to another embodiment of the related art.

In FIG. 4, horizontal portions 56a of a common electrode are formed on a substrate 50. A gate insulating layer 58 and a passivation layer 68 are sequentially formed on the horizontal portions 56a of the common electrode. Horizontal parts 72a of a pixel electrode are formed on the passivation layer 68. Each of the horizontal parts 72a is disposed between adjacent horizontal portions 56a.

After the horizontal portions 56a are patterned through a mask process, the horizontal parts 72a of the pixel electrode are patterned through another mask process. Each mask process includes a light-exposing step. A substrate is repeatedly exposed to light, moving with respect to a mask because the mask is relatively very small in comparison with the substrate. Thus, during the light-exposing step, the mask may be misaligned with the substrate.

As shown in FIG. 4, there is no misalignment in a first area NA. However, when a second area ANA is exposed to light in order to form the pixel electrode, the mask may be misaligned with the substrate 50. A distance L1 between the common electrode and the pixel electrode in the first area NA is not equal to a distance L2 between the common electrode and the pixel electrode. Accordingly, the quality of displayed images is not uniform in some areas.

Moreover, since the common electrode is formed of an opaque material, the brightness of the device is relatively low.

BRIEF SUMMARY

Accordingly, the present embodiments are directed to an in-plane switching mode liquid crystal display device that substantially obviates one or more problems due to limitations and disadvantages of the related art.

In a first aspect, an array substrate for an in-plane switching mode liquid crystal display device includes a substrate, a gate line along a first direction on the substrate, a data line along a second direction and crossing the gate line to define a pixel region, a common line on the substrate, a thin film transistor connected to the gate and data lines, and a pixel electrode in the pixel region and connected to the thin film transistor. The pixel electrode includes horizontal parts along the first direction. A common electrode is provided in the pixel region and connected to the common line. The common electrode includes horizontal portions along the first direction. The pixel electrode and the common electrode are formed on a same layer.

In a second aspect, a method of manufacturing an array substrate for an in-plane switching mode liquid crystal display device includes forming a gate line along a first direction on a substrate, forming a data line along a second direction, the data line crossing the gate line to define a pixel region, forming a common line on the substrate, forming a thin film transistor connected to the gate and data lines, and forming a pixel electrode in the pixel region and connected to the thin film transistor. The pixel electrode includes horizontal parts of the first direction. A common electrode is formed in the pixel region and connected to the common line. The common electrode includes horizontal portions. The pixel electrode is formed simultaneously with the common electrode.

In a third aspect, a method of manufacturing an array substrate for an in-plane switching mode liquid crystal display device includes forming a gate line, a gate electrode and a common line on a substrate. The gate line extends along a first direction and is connected to the gate line. The common line is disposed between adjacent gate lines. An active layer and an ohmic contact layer are formed over the gate electrode. A data line, a source electrode and a drain electrode are formed on the ohmic contact layer. The data line extends along a second direction and crosses the gate line to define a pixel region. The source electrode is connected to the data line, and the drain electrode is spaced apart from the source electrode. A passivation layer is formed covering the data line, the source electrode and the drain electrode. The passivation layer includes a first contact hole exposing the drain electrode and at least one second contact hole exposing the common line. A pixel electrode and a common electrode are formed on the passivation layer, the pixel electrode including horizontal parts of the first direction, and the common electrode including horizontal portions.

In a fourth aspect, a method of manufacturing an array substrate for an in-plane switching mode liquid crystal display device includes forming a gate line along a first direction on a substrate, forming a data line along a second direction, the data line crossing the gate line to define a pixel region, forming a common line on the substrate, forming a thin film transistor connected to the gate and data lines, and forming a pixel electrode in the pixel region and connected to the thin film transistor. The pixel electrode includes horizontal parts along the first direction. A common electrode is formed in the pixel region on the same layer as the pixel electrode. The common electrode is connected to the common line and includes horizontal portions along the first direction.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this specification, illustrate embodiments of the disclosure and together with the description serve to explain the principles of the disclosure. In the drawings:

FIGS. 6A to 6D and FIGS. 7A to 7D are cross-sectional views of an array substrate in processes of manufacturing the same according to the first embodiment;

DETAILED DESCRIPTION OF THE DRAWINGS AND THE PRESENTLY PREFERRED EMBODIMENTS

Reference will now be made in detail to the embodiments of the present disclosure, examples of which are illustrated in the accompanying drawings.

Figure 1:
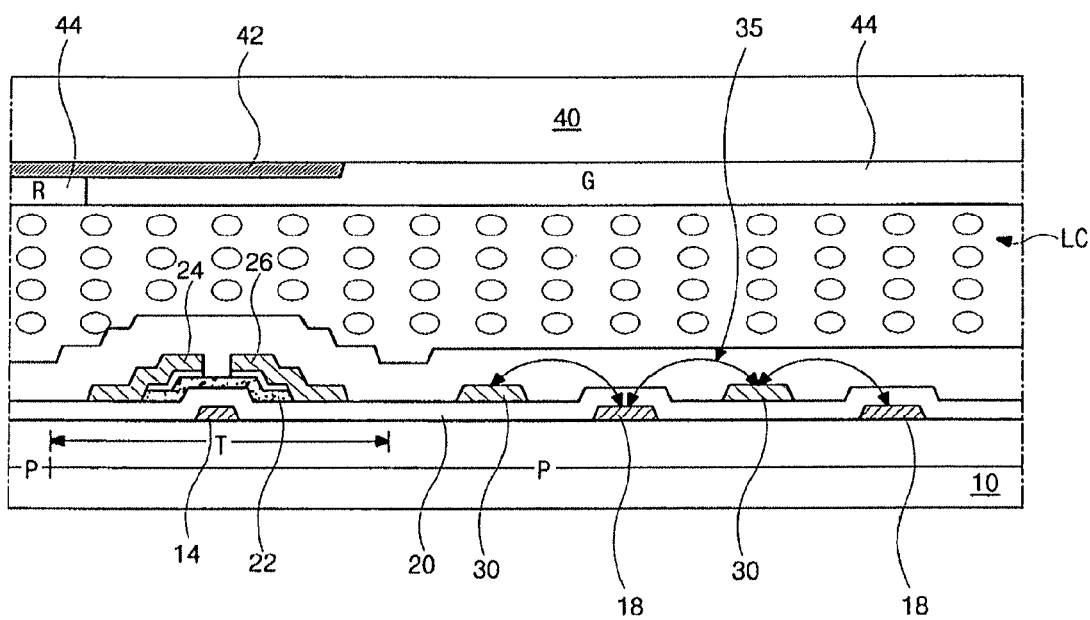
FIG. 1 is a schematic cross-sectional view of an IPS mode LCD device according to the related art.
Figure 2:
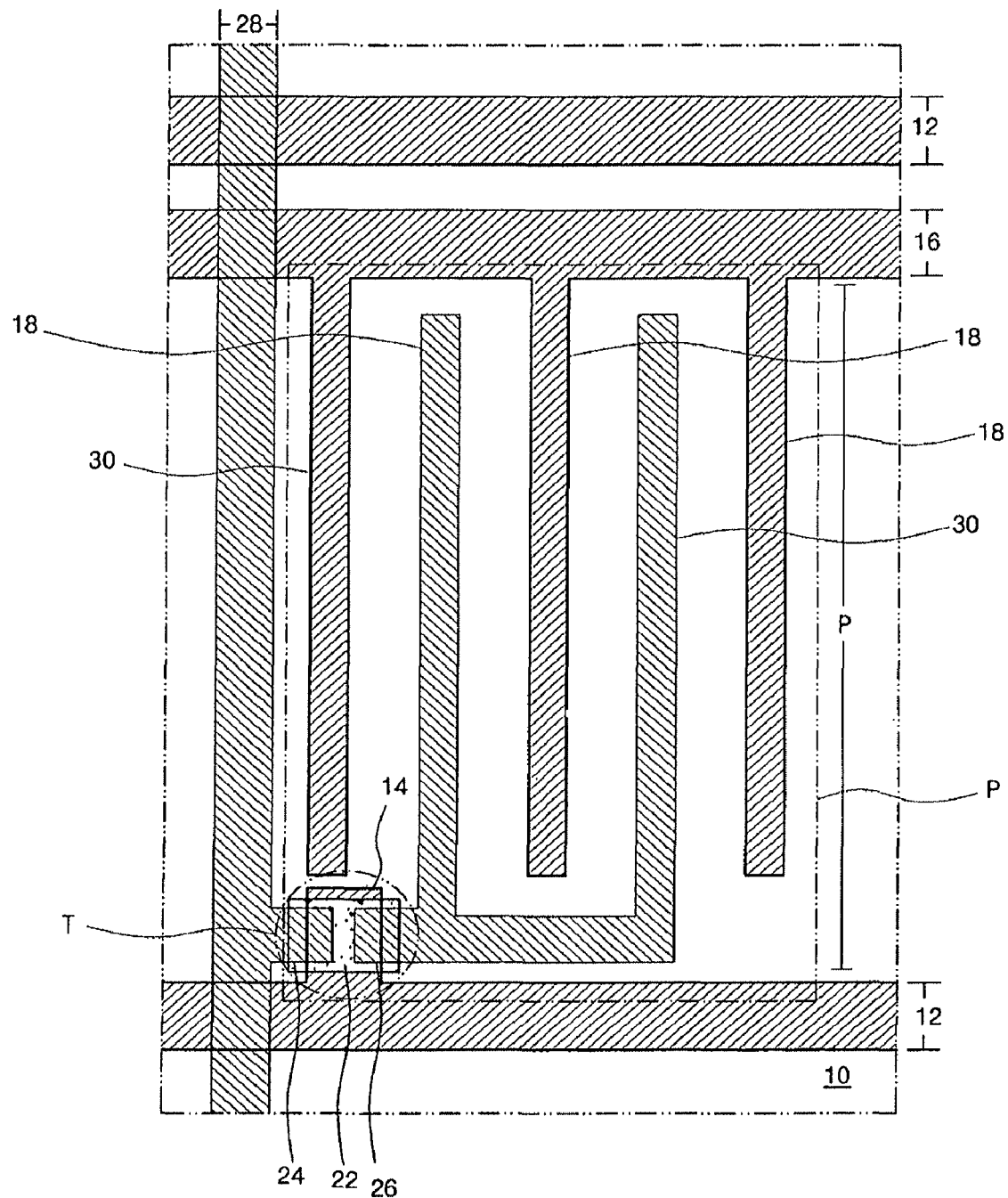
FIG. 2 is a schematic plan view of an array substrate for an IPS mode LCD device according to the related art.
Figure 3:
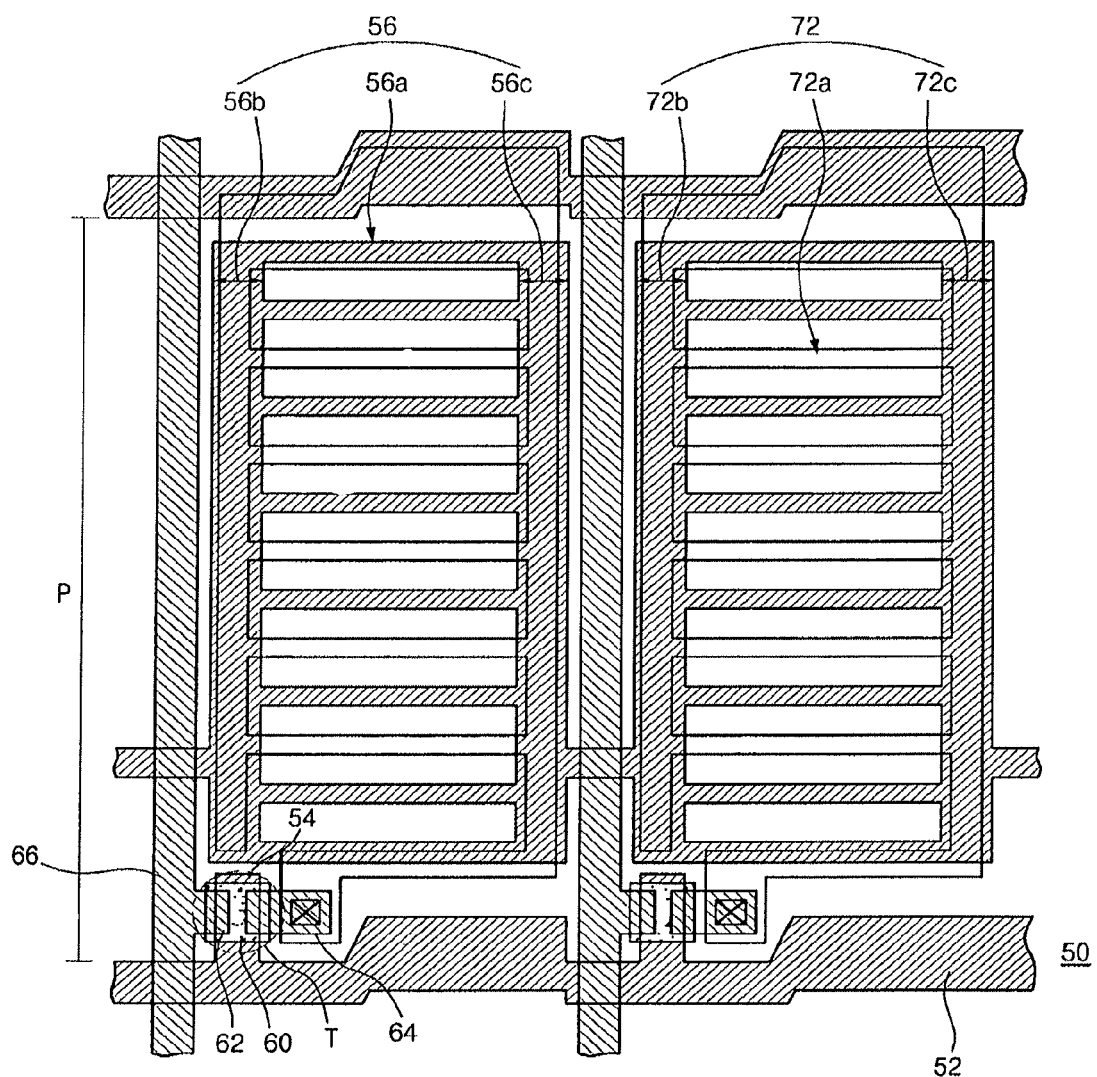
FIG. 3 is a plan view of an array substrate for an IPS mode LCD device according to another embodiment of the related art.
Figure 4:
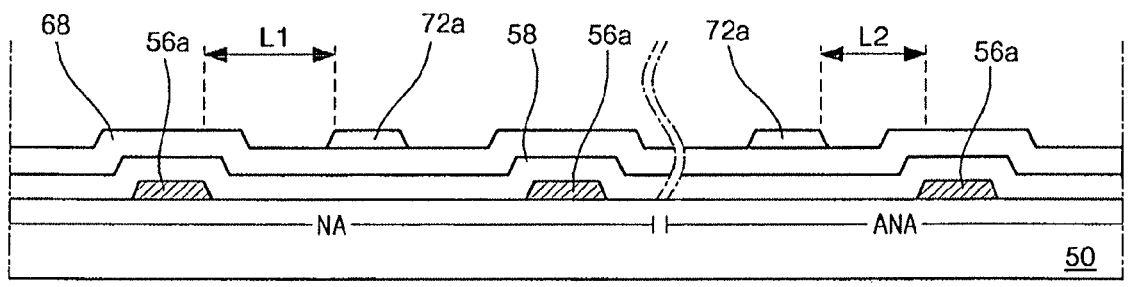
FIG. 4 is a cross-sectional view of an array substrate for an IPS mode LCD device according to another embodiment of the related art.
Figure 5:
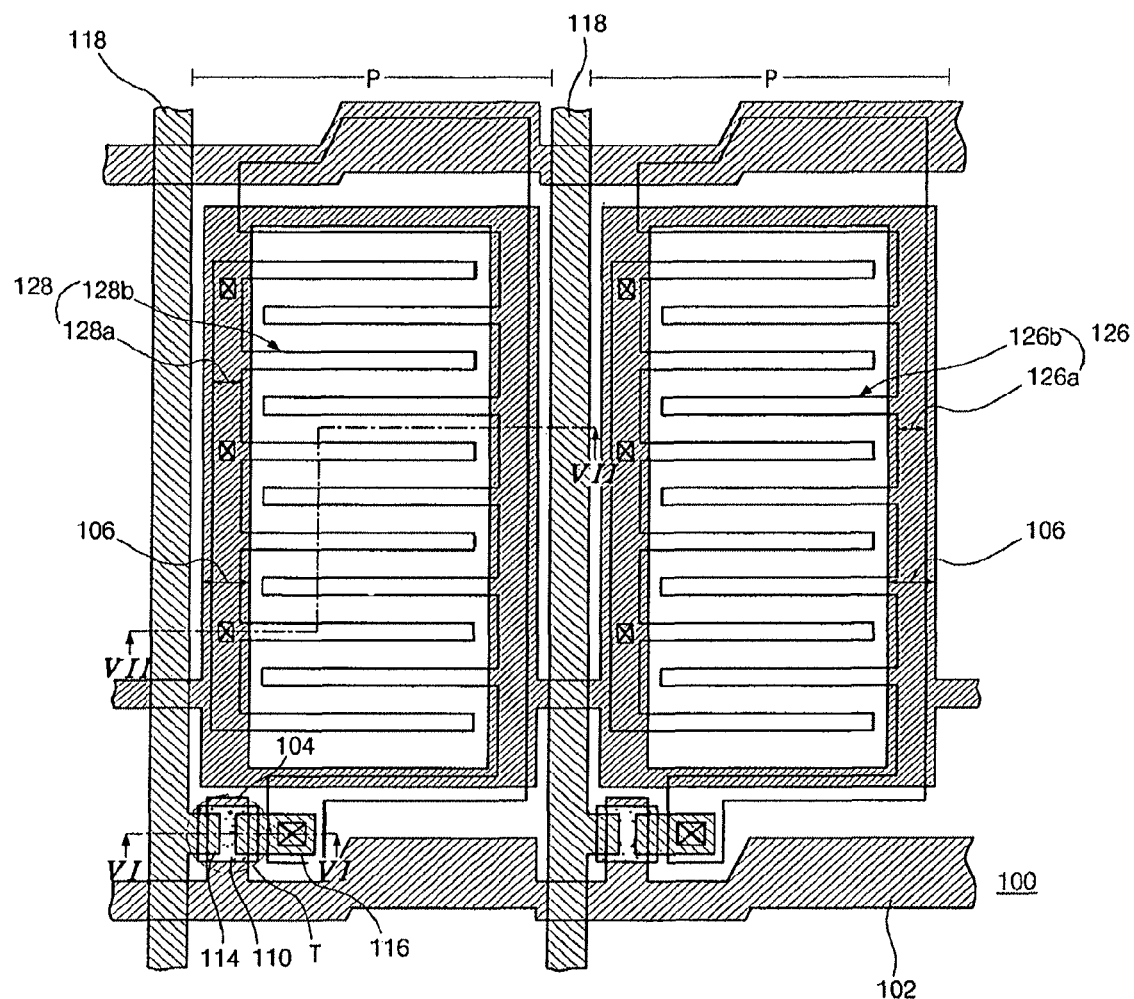
FIG. 5 is a plan view of an array substrate for an IPS mode LCD device according to a first embodiment of the present invention.

FIG. 5 is a plan view of an array substrate for an in-plane switching (IPS) mode liquid crystal display (LCD) device according to a first embodiment of the present invention. In the first embodiment, a pixel electrode and a common electrode are formed of a transparent conductive material and in a same layer. Parts of the pixel electrode and portions of the common electrode are substantially parallel to a gate line.

In FIG. 5, gate lines 102 are formed along a first direction on a substrate 100, and data lines 118 are formed along a second direction crossing the first direction. The gate lines 102 and the data lines 118 cross each other to define pixel regions P. A thin film transistor T is formed at each crossing point of the gate lines 102 and the data lines 118. The thin film transistor T is connected to the gate and data lines 102 and 118. The thin film transistor T includes a gate electrode 104, an active layer 110, a source electrode 114 and a drain electrode 116.

A common line 106 is formed on the substrate 100. The common line 106 may be formed in the same layer as the gate line 102. The common line 106 includes a portion of a loop shape at each pixel region P. The portion is disposed along peripheries of the pixel region P, and the portion is substantially a square. The portions at adjacent pixel regions P are connected to each other along the first direction. The common line 106 may have other shapes.

A common electrode 128 and a pixel electrode 126 are formed in each pixel region P. The common electrode 128 is connected to the common line 106, and the pixel electrode 126 is connected to the drain electrode 116. The common electrode 128 is composed of a vertical portion 128a and horizontal portions 128b. The vertical portion 128a is disposed at a first side of the pixel region P along the second direction, and the horizontal portions 128b extend from the vertical portion 128a along the first direction. The pixel electrode 126 is composed of a vertical part 126a and horizontal parts 126b. The vertical part 126a is disposed at a second side of the pixel region P, which is opposite to the first side of the pixel region P, along the second direction, and the horizontal parts 126b extend from the vertical part 126a along the first direction. The horizontal parts 126b alternate with the horizontal portions 128b.

Here, the pixel electrode 126 and the common electrode 128 may be formed in the same layer. Therefore, although the mask for forming the pixel electrode 126 and the common electrode 128 may be misaligned with the substrate 100, distances between the horizontal parts 126b and the horizontal portions 128b are kept uniform.

Meanwhile, the pixel electrode 126 and the common electrode 128 may be formed of a transparent conductive material. The aperture ratio is increased, and the brightness of the device is improved.

In addition, if the horizontal portions 128b and the horizontal parts 126b are inclined with a predetermined angle with respect to the first direction, the viewing angles may be increased in a diagonal direction of the device.

A method of manufacturing an array substrate according to the first embodiment will be described hereinafter with reference to accompanying drawings.

FIGS. 6A to 6D and FIGS. 7A to 7D are cross-sectional views of an array substrate in processes of manufacturing the same according to the first embodiment. FIGS. 6A to 6D correspond to the line VI-VI of FIG. 5. FIGS. 7A to 7D correspond to the line VII-VII of FIG. 5.

Figure 6A:
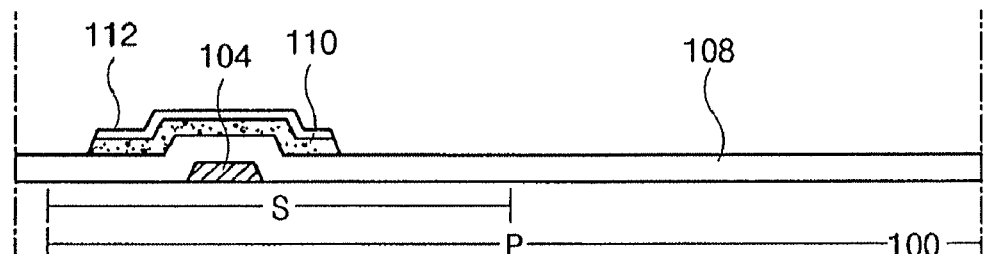

In FIG. 6A and FIG. 7A, a switching region S and a pixel region P are defined on a substrate 100. The pixel region P may include the switching region S. A gate line 102 of FIG. 5 and a gate electrode 104 are formed on the substrate 100. The gate line 102 of FIG. 5 extends along a first direction, and the gate electrode 104 is connected to the gate line 102 of FIG. 5. A common line 106 is also formed on the substrate 100. The common line 106 includes portions along peripheries of each pixel region P. The portions of the common line 106 at adjacent pixel regions P are connected to each other.

A gate insulating layer 108 is formed substantially on an entire surface of the substrate 100 including the gate line 102 of FIG. 5, the gate electrode 104, and the common line 106 by depositing one selected from an inorganic insulating material group including silicon nitride (SiNX) and silicon oxide (SiO2).

An active layer 110 and an ohmic contact layer 112 are formed on the gate insulating layer 108 over the gate electrode 104 by depositing intrinsic amorphous silicon (a-Si:H) and impurity-doped amorphous silicon (for example, n+a-Si:

H) substantially on an entire surface of the substrate 100 including the gate insulating layer 108 and patterning them.

Figure 6B:
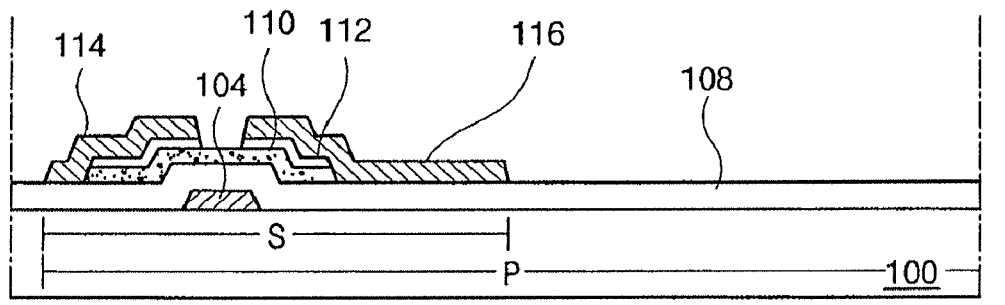

In FIG. 6B and FIG. 7B, source and drain electrodes 114 and 116 are formed on the ohmic contact layer 112 by depositing a metallic material substantially on an entire surface of the substrate 100 including the active layer 110 and the ohmic contact layer 112 and then patterning it. The source and drain electrodes 114 and 116 are spaced apart from each other. A data line 118 is formed simultaneously with the source and drain electrodes 114 and 116. The data line 118 is connected to the source electrode 114. Although not shown in the figure, the data line 118 extends along a second direction and crosses the gate line 102 of FIG. 5 to define the pixel region P. The metallic material may be one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW).

Next, a part of the ohmic contact layer 112 is removed between the source and drain electrodes 114 and 116, thereby exposing the active layer 110.

Figure 6C:
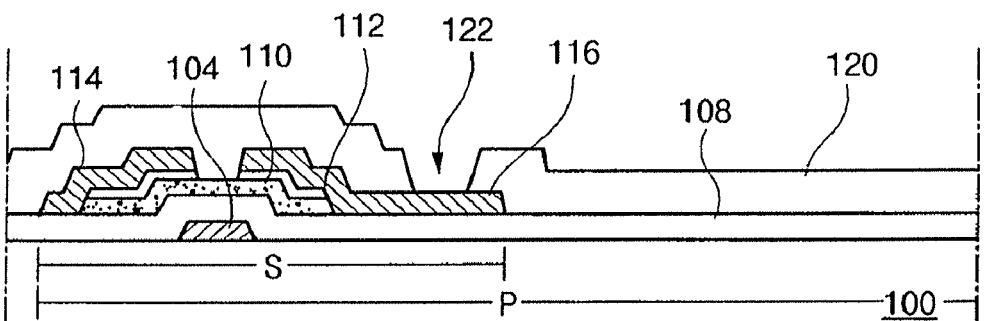
Figure 7C:
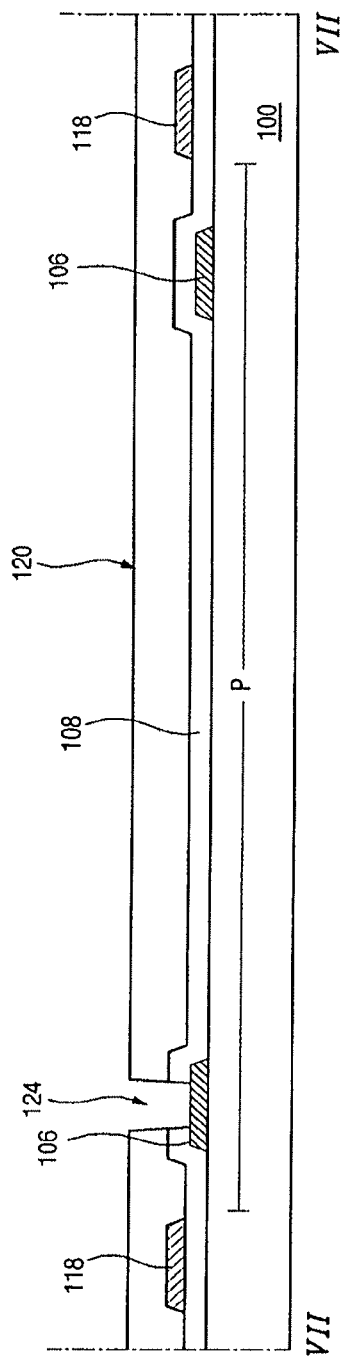

In FIG. 6C and FIG. 7C, a passivation layer 120 is formed substantially on an entire surface of the substrate 100 including the source and drain electrodes 114 and 116 by depositing one selected from an inorganic insulating material group including silicon nitride (SiNX) and silicon oxide (SiO2) or coating the substrate 100 with one or more selected from an organic insulating material group including benzocyclobutene (BCB) and acrylic resin. The passivation layer 120 is patterned to thereby form a drain contact hole 122 and common line contact holes 124. The drain contact hole 122 exposes a part of the drain electrode 116, and the common line contact holes 124 expose parts of the common line 106.

Figure 6D:
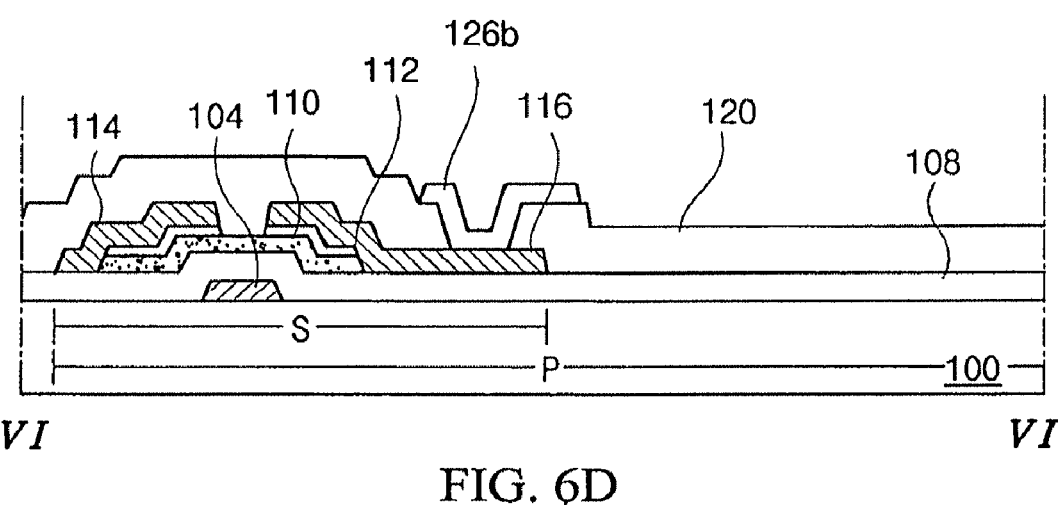
Figure 7D:
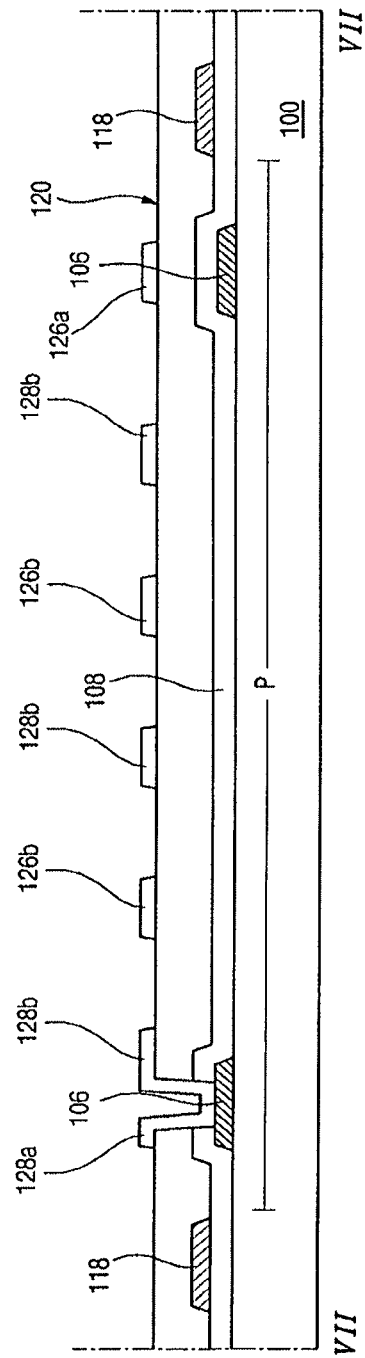

In FIG. 6D and FIG. 7D, a pixel electrode 126 and a common electrode 128 are formed on the passivation layer 120 by depositing a transparent conductive material substantially on an entire surface of the substrate 100 including the passivation layer 120 and then patterning it. The transparent conductive material is selected from a transparent conductive metallic group including indium tin oxide (ITO) and indium zinc oxide (IZO). The pixel electrode 126 is connected to the drain electrode 116 through the drain contact hole 122, and the common electrode 128 is connected to the common line 106 through the common line contact holes 124.

As stated above, the pixel electrode 126 includes a vertical part 126a and horizontal parts 126b. The common electrode 128 includes a vertical portion 128a and horizontal portions 128b. The vertical part 126a and the vertical portion 128a are disposed at opposite sides of the pixel region P and overlap the portions of the common line 106. The vertical part 126a and the vertical portion 128a are near by adjacent data lines 118, respectively. The horizontal parts 126b extend from the vertical part 126a, and the horizontal portions 128b extend from the vertical portion 128a.

The array substrate may be manufactured through the above-mentioned 4 mask processes according to the first embodiment. In the first embodiment, the pixel electrode and the common electrode are transparent, and the brightness of the device is increased. Since the parts of the pixel electrode and the portions of the common electrode are substantially parallel to the gate line, the viewing angles are improved in an up-down direction with respect to the device.

In a second embodiment, a vertical portion, which is connected to horizontal portions of a common electrode, and a vertical part, which is connected to horizontal parts of a pixel electrode, are formed on a different layer from the horizontal portions and the horizontal parts. The horizontal portions and the horizontal parts overlap the vertical portion and the vertical part.

Figure 8:
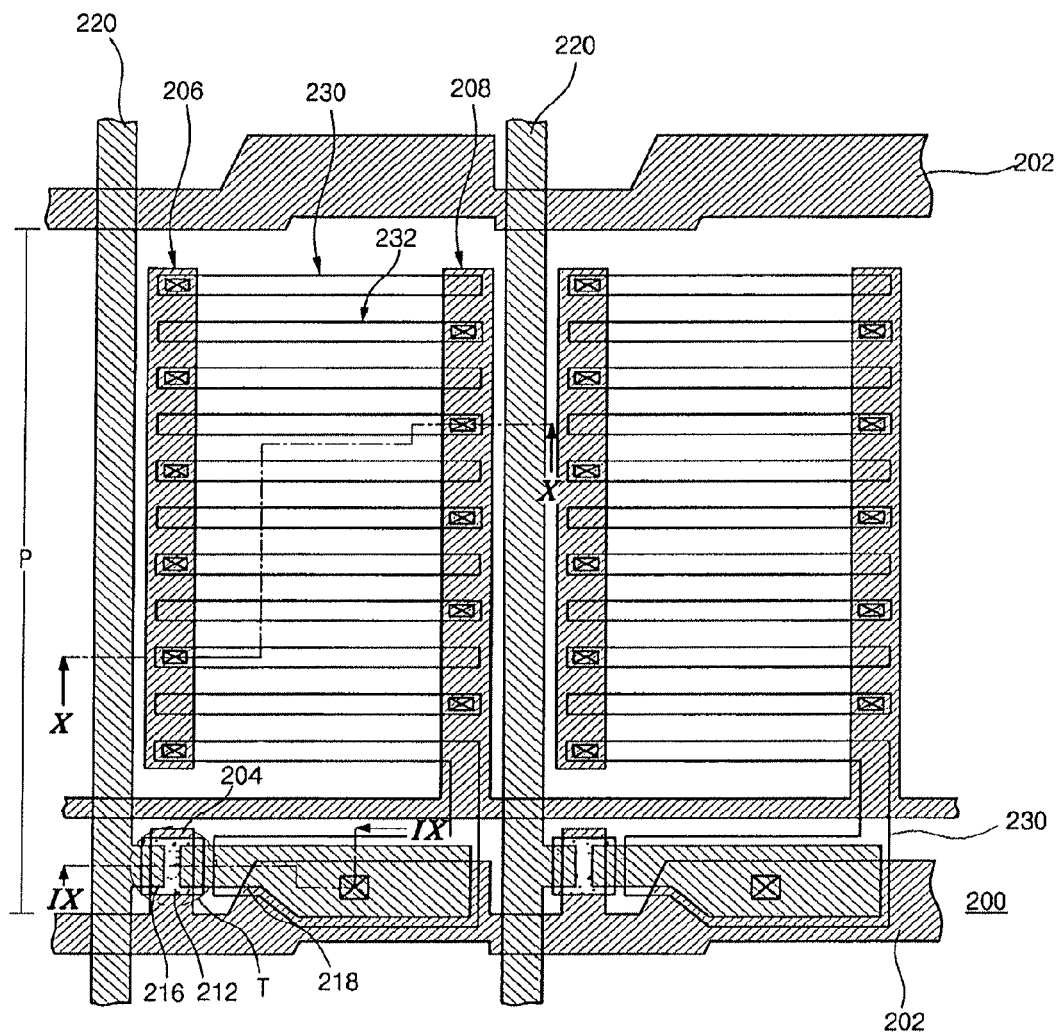
FIG. 8 is a plan view of an array substrate for an IPS mode LCD device according to a second embodiment of the present invention.

FIG. 8 is a plan view of an array substrate for an IPS mode LCD device according to a second embodiment of the present invention. In FIG. 8, gate lines 202 are formed along a first direction on a substrate 200, and data lines 220 are formed along a second direction crossing the first direction. The gate lines 202 and the data lines 220 cross each other to define pixel regions P. A thin film transistor T is formed at each crossing point of the gate lines 202 and the data lines 220. The thin film transistor T is connected to the gate and data lines 202 and 220. The thin film transistor T includes a gate electrode 204, an active layer 212, a source electrode 216 and a drain electrode 218.

A common line 208 and a metallic pattern 206 are formed on the substrate 200. The common line 208 and the metallic pattern 206 may be formed in the same layer as the gate line 202. The common line 208 includes a vertical portion of the second direction at each pixel region P. The metallic pattern 206 and the vertical portion of the common line 208 are parallel to each other and disposed at opposite sides of each pixel region P. The vertical portions of the common line 208 at adjacent pixel regions are connected to each other along the first direction. The metallic patterns 206 at adjacent pixel regions P are disconnected to each other.

A common electrode 232 and a pixel electrode 230 are formed in each pixel region P. The common electrode 232 is connected to the common line 208, and the pixel electrode 230 is connected to the drain electrode 218 and the metallic pattern 206. The pixel electrode 230 and the common electrode 232 are formed on the same layer and are formed of a transparent conductive material.

More particularly, the common electrode 232 includes a plurality of horizontal portions. The pixel electrode 230 includes a plurality of horizontal parts. The horizontal portions alternate with the horizontal parts. The horizontal portions overlap the metallic pattern 206 and the vertical portion of the common line 208 and contact the vertical portion of the common line 208. The horizontal parts overlap the metallic pattern 206 and the vertical portion of the common line 208 and contact the metallic pattern 206.

If the metallic pattern 206 and the vertical portion of the common line 208 are formed on a same layer as the common electrode 232 and the pixel electrode 230, to prevent a short circuit between the pixel electrode 230 and the common electrode 232, there should exist areas horizontally spaced between each horizontal portion and the metallic pattern 206 for contacting the horizontal parts and between each horizontal part and the vertical portion of the common line 208 for contacting the horizontal portions. By the way, an electric field may be differently induced in the areas from other areas. Since liquid crystal molecules may be irregularly arranged in the areas due to the different electric field, the areas may decrease the brightness of the device and the aperture ratio.

However, in the second embodiment, the metallic pattern 206 and the vertical portion of the common line 208 are formed on a different layer from the pixel electrode 230 and the common electrode 232 and overlap the horizontal portions of the common electrode 232 and the horizontal parts of the pixel electrode 230. There is no area horizontally spaced between each horizontal portion and the metallic pattern 206 and between each horizontal part and the vertical portion of the common line 208. Accordingly, the short circuit can be prevented between the pixel electrode 230 and the common electrode 232, and the aperture ratio and the brightness of the device may be improved.

A method of manufacturing an array substrate according to the second embodiment will be described hereinafter with reference to accompanying drawings.

FIGS. 9A to 9D and FIGS. 10A to 10D illustrate an array substrate in processes of manufacturing the same according to the second embodiment. FIGS. 9A to 9D are cross-sectional views corresponding to the line IX-IX of FIG. 8. FIGS. 10A to 10D are cross-sectional views corresponding to the line X-X of FIG. 8.

Figure 9A:
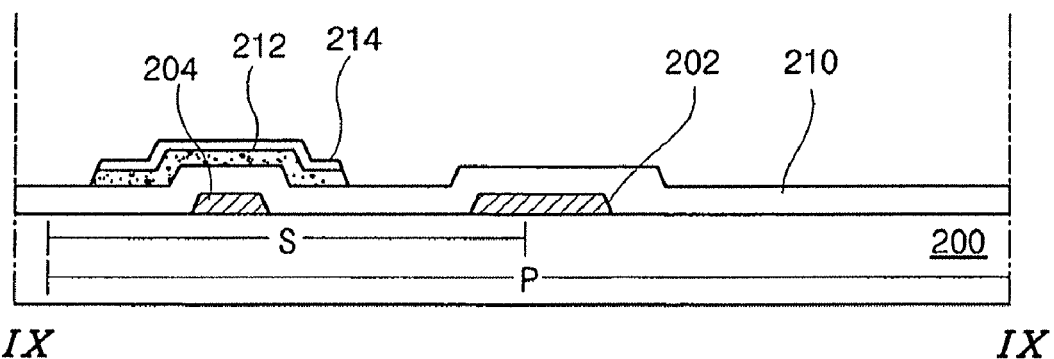
FIGS. 9A to 9D and FIGS. 10A to 10D illustrate an array substrate in processes of manufacturing the same according to the second embodiment.
Figure 10A:
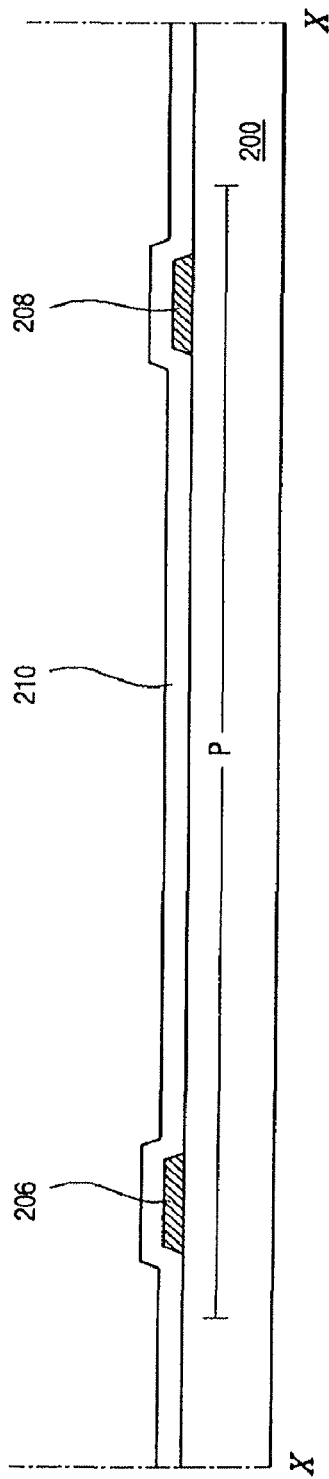

In FIG. 9A and FIG. 10A, a switching region S and a pixel region P are defined on a substrate 200. The pixel region P may include the switching region S. A gate line 202 of FIG. 8 and a gate electrode 204 are formed on the substrate 200. The gate line 202 of FIG. 8 extends along a first direction, and the gate electrode 204 is connected to the gate line 202 of FIG. 8. A metallic pattern 206 and a common line 208 are also formed in the pixel region P on the substrate 200. The common line 208 includes a vertical portion disposed at a first side of the pixel region P. The metallic pattern 206 is disposed at a second side of the pixel region P opposite to the first side. Although not shown in the figures, the metallic pattern 206 and the vertical portion of the common line 208 extend along a second direction crossing the first direction. The vertical portion of the common line 208 is connected to those at adjacent pixel regions P.

A gate insulating layer 210 is formed substantially on an entire surface of the substrate 200 including the gate line 202, the gate electrode 204, the metallic pattern 206 and the common line 208 by depositing one selected from an inorganic insulating material group including silicon nitride (SiNX) and silicon oxide (SiO2).

An active layer 212 and an ohmic contact layer 214 are formed on the gate insulating layer 210 over the gate electrode 204 by depositing intrinsic amorphous silicon (a-Si:H) and impurity-doped amorphous silicon (for example, n+a-Si:H) substantially on an entire surface of the substrate 200 including the gate insulating layer 210 and patterning them.

Figure 9B:
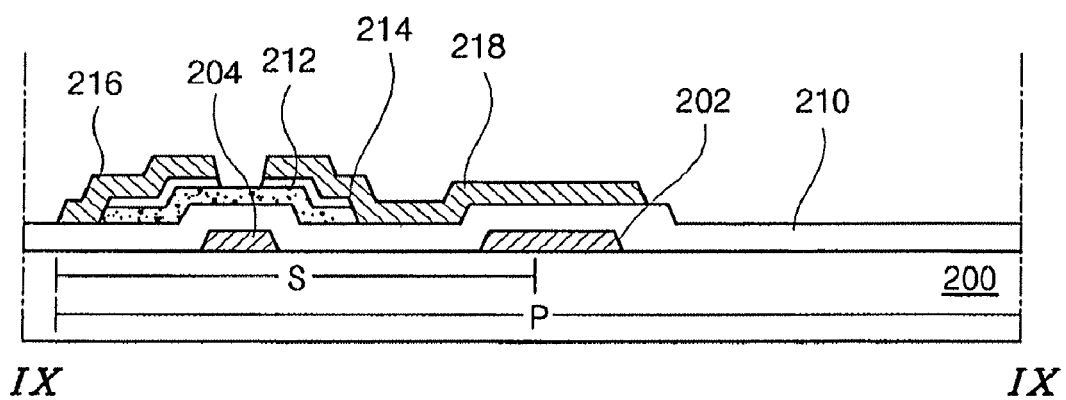
Figure 10B:
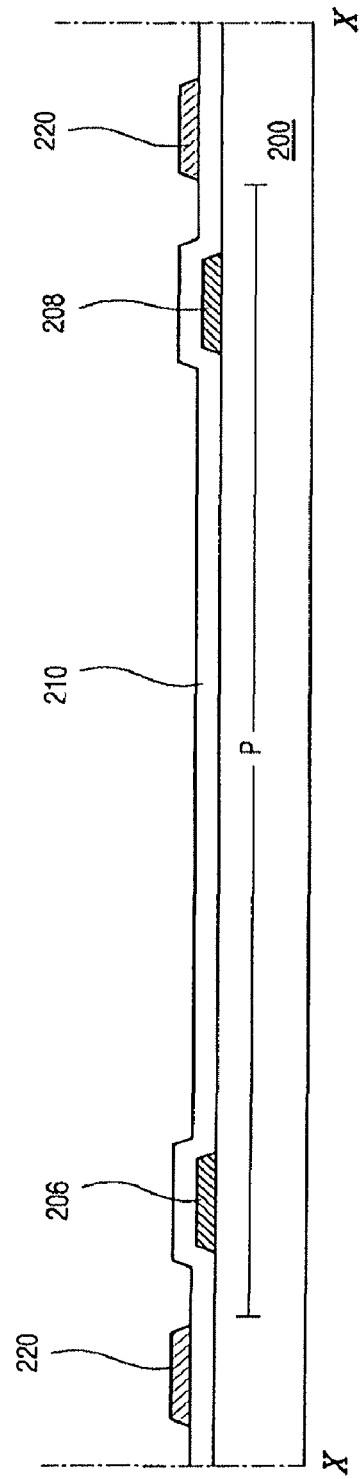
Figure 10C:
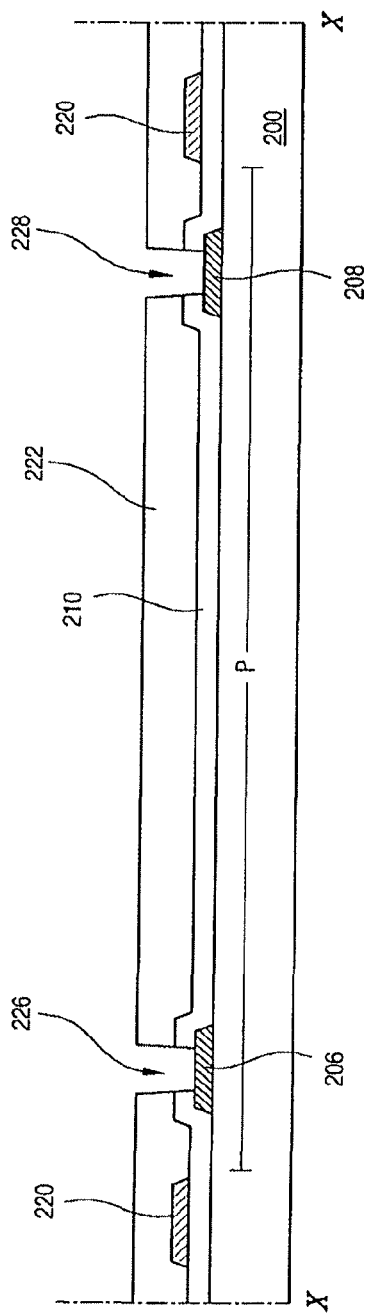

In FIG. 9B and FIG. 10B, source and drain electrodes 216 and 218 are formed on the ohmic contact layer 214 by depositing a metallic material substantially on an entire surface of the substrate 200 including the active layer 212 and the ohmic contact layer 214 and then patterning it. The source and drain electrodes 216 and 218 are spaced apart from each other. A data line 220 is formed simultaneously with the source and drain electrodes 216 and 218. The data line 220 is connected to the source electrode 216. Although not shown in the figures, the data line 220 extends along the second direction and crosses the gate line 202 of FIG. 8 to define the pixel region P. The metallic material may be one or more selected from a conductive metallic group including aluminum (Al), an aluminum alloy such as aluminum neodymium (AlNd), chromium (Cr), tungsten (W), molybdenum (Mo), titanium (Ti) and molybdenum-tungsten (MoW).

Next, a part of the ohmic contact layer 214 is removed between the source and drain electrodes 216 and 218, thereby exposing the active layer 212.

Figure 9C:
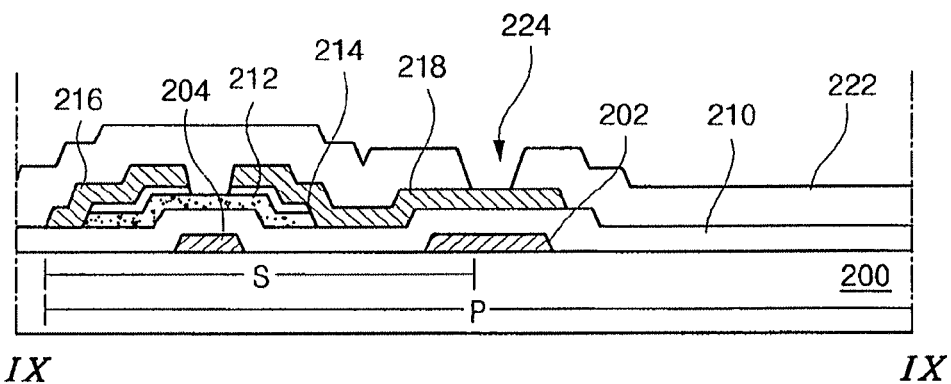

In FIG. 9C and FIG. 10O, a passivation layer 222 is formed substantially on an entire surface of the substrate 200 including the source and drain electrodes 216 and 218 by depositing one selected from an inorganic insulating material group including silicon nitride (SiNX) and silicon oxide (SiO2) or coating the substrate 200 with one or more selected from an organic insulating material group including benzocyclobutene (BCB) and acrylic resin. The passivation layer 222 is patterned to thereby form a first contact hole 224, second contact holes 226 and third contact holes 228. The first contact hole 224 exposes a part of the drain electrode 218, the second contact holes 226 expose parts of the metallic pattern 206, and the third contact holes 228 expose parts of the common line 208.

Figure 9D:
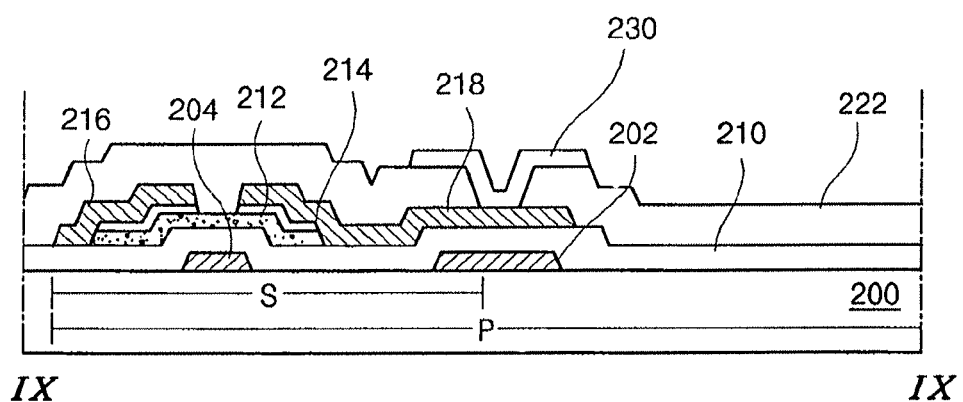
Figure 10D:
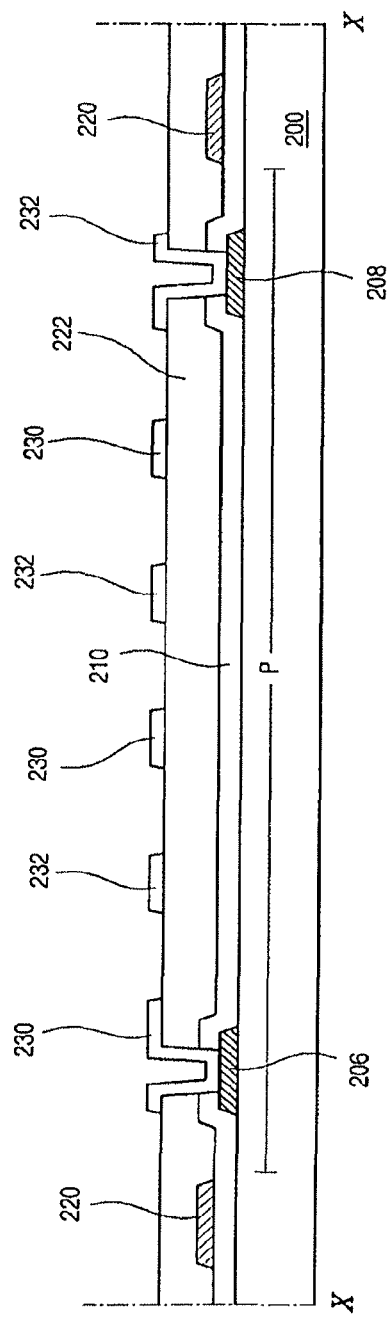

In FIG. 9D and FIG. 10D, a pixel electrode 230 and a common electrode 232 are formed on the passivation layer 222 by depositing a transparent conductive material substantially on an entire surface of the substrate 200 including the passivation layer 222 and then patterning it. The transparent conductive material is selected from a transparent conductive metallic group including indium tin oxide (ITO) and indium zinc oxide (IZO). The pixel electrode 230 is connected to the drain electrode 218 through the first contact hole 224 and is connected to the metallic pattern 206 through the second contact holes 226. The common electrode 232 is connected to the common line 208 through the third contact holes 228.

As stated above, the pixel electrode 230 includes horizontal parts extending along the first direction and parallel to the gate line 202 of FIG. 8. The common electrode 232 includes horizontal portions extending along the first direction and parallel to the gate line 202 of FIG. 8. The horizontal parts of the pixel electrode 230 alternate with the horizontal portions of the common electrode 232. The horizontal parts of the pixel electrode 230 overlap the metallic pattern 206 and the common line 208. The horizontal portions of the common electrode 232 overlap the metallic pattern 206 and the common line 208. The horizontal parts of the pixel electrode 230 contact the metallic pattern 206 through the second contact holes 226, respectively. The horizontal portions of the common electrode 232 contact the common line 208 through the third contact holes 228, respectively.

In the second embodiment, since there is no area horizontally spaced between the common electrode and the metallic pattern and between the pixel electrode and the common line, the aperture ratio is increased, and the brightness of the device is improved.

Figure 11:
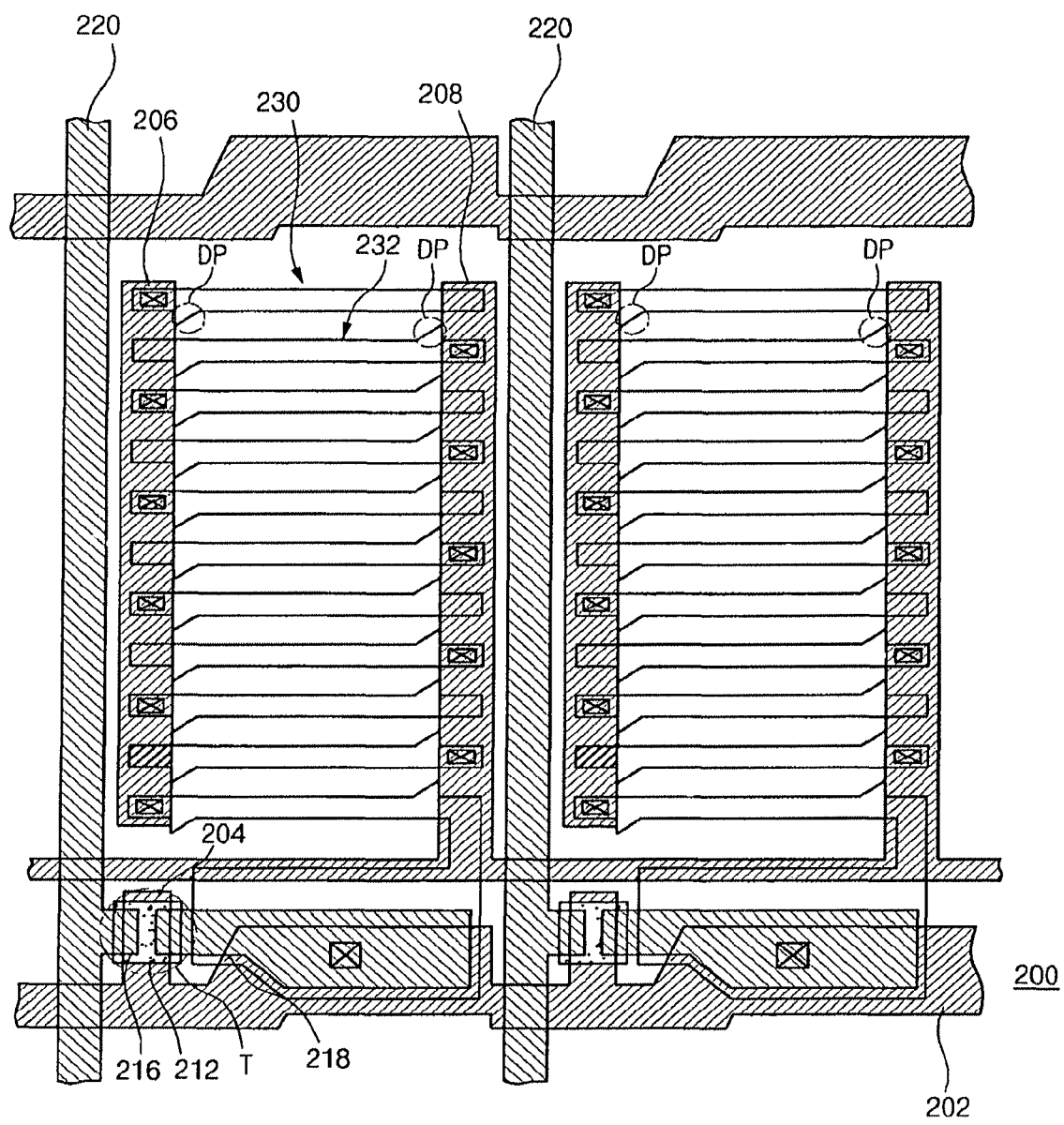
FIG. 11 is a plan view of an array substrate for an IPS mode LCD device according to a third embodiment of the present invention.

To prevent disclination in a displayed image, an array substrate according to a third embodiment will be illustrated in FIG. 11. FIG. 11 is a plan view of an array substrate for an IPS mode LCD device according to the third embodiment of the present invention.

In FIG. 11, gate lines 202 are formed along a first direction on a substrate 200, and data lines 220 are formed along a second direction crossing the first direction. The gate lines 202 and the data lines 220 cross each other to define pixel regions P. A thin film transistor T is formed at each crossing point of the gate lines 202 and the data lines 220. The thin film transistor T is connected to the gate and data lines 202 and 220. The thin film transistor T includes a gate electrode 204, an active layer 212, a source electrode 216 and a drain electrode 218.

A common line 208 and a metallic pattern 206 are formed on the substrate 200. The common line 208 and the metallic pattern 206 may be formed in the same layer as the gate line 202. The common line 208 includes a vertical portion of the second direction at each pixel region P. The metallic pattern 206 and the vertical portion of the common line 208 are parallel to each other and disposed at opposite sides of each pixel region P between adjacent gate lines 202. The vertical portions of the common line 208 at adjacent pixel regions are connected to each other along the first direction. The metallic patterns 206 at adjacent pixel regions P are disconnected to each other.

A common electrode 232 and a pixel electrode 230 are formed in each pixel region P. The common electrode 232 is connected to the common line 208, and the pixel electrode 230 is connected to the drain electrode 218 and the metallic pattern 206. The pixel electrode 230 and the common electrode 232 are formed on the same layer and are formed of a transparent conductive material.

More particularly, the common electrode 232 includes a plurality of horizontal portions. The pixel electrode 230 includes a plurality of horizontal parts. The horizontal portions alternate with the horizontal parts. The horizontal portions overlap the metallic pattern 206 and the vertical portion of the common line 208 and contact the vertical portion of the common line 208. The horizontal parts overlap the metallic pattern 206 and the vertical portion of the common line 208 and contact the metallic pattern 206.

The common electrode 232 further includes protrusions DP at a first end of a first side of each horizontal portion and at a second end of a second side of each horizontal portion, wherein the first end is opposite to the second end. The pixel electrode 230 further includes protrusions DP at a first end of a first side of each horizontal part and at a second end of a second side of each horizontal part, wherein the first end is opposite to the second end. The protrusions DP of the common electrode 232 and the pixel electrode 230 may have a triangle shape. The protrusions DP of the common electrode 232 and the pixel electrode 230 control electric fields such that the electric fields may be regularly induced around areas where the common electrode 232 and the pixel electrode 230 meet the metallic pattern 206 and the common line 208. Therefore, the disclination in the displayed image can be prevented due to the protrusions DP.

In the present invention, the common electrode and the pixel electrode are transparent. In addition, the common and pixel electrodes overlap the metallic pattern and the common line, and aperture areas are increased. Therefore, the aperture ratio is increased, and the brightness is improved.

Meanwhile, the disclination in the displayed image can be prevented due to the protrusions DP of the common and pixel electrodes. The quality of the image is improved.

Moreover, the pixel electrode and the common electrode are substantially parallel to the gate line, the viewing angles are improved in an up-down direction with respect to the device.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

The invention claimed is:

1. A method of manufacturing an array substrate for an in-plane switching mode liquid crystal display device, comprising:
    forming a gate line, a gate electrode and a common line on a substrate, the gate line extending along a first direction, the gate electrode connected to the gate line, and the common line disposed between adjacent gate lines;
    forming an active layer and an ohmic contact layer over the gate electrode;
    forming a data line, a source electrode and a drain electrode on the ohmic contact layer, the data line extending along a second direction and crossing the gate line to define a pixel region, the source electrode connected to the data line, and the drain electrode spaced apart from the source electrode;
    forming a passivation layer covering the data line, the source electrode and the drain electrode, the passivation layer including a first contact hole exposing the drain electrode and at least one second contact hole exposing the common line; and
    forming a pixel electrode and a common electrode on the passivation layer, the pixel electrode including horizontal parts along the first direction, and the common electrode including horizontal portions along the first direction,
    wherein the pixel electrode further includes a portion directly connected to one of the horizontal parts, wherein the portion overlaps and contacts the drain electrode through a contact hole, wherein the portion overlaps the gate line.

2. The method according to claim 1, wherein the pixel electrode and the common electrode are formed of a transparent conductive material.

3. The method according to claim 1, wherein forming the pixel electrode and the common electrode further includes forming a vertical part connected to the horizontal parts and a vertical portion connected to the horizontal portions, wherein the vertical part and the vertical portion extend along the second direction and are disposed at opposite sides of the pixel region.

4. The method according to claim 3, wherein forming the gate line, the gate electrode and the common line further includes forming a square loop portion of the common line at the pixel region.

5. The method according to claim 4, wherein the common line overlaps the vertical portion and the vertical part.

6. The method according to claim 1, wherein forming the gate line, the gate electrode and the common line further includes forming a metallic pattern of the second direction, wherein the metallic pattern contacts the horizontal parts.

7. The method according to claim 6, wherein forming the gate line, the gate electrode and the common line further includes forming a vertical portion of the common line, wherein the vertical portion extends along the second direction, and the metallic pattern and the vertical portion are disposed at opposite sides of the pixel region.

8. The method according to claim 7, wherein the metallic pattern overlaps the horizontal portions and the horizontal parts, and the vertical portion of the common line overlaps the horizontal portions and the horizontal parts.

9. The method according to claim 8, wherein forming the common electrode further includes forming first protrusions at a first end of a first side of each horizontal portion and at a second end of a second side of each horizontal portion.

10. The method according to claim 9, wherein forming the pixel electrode further includes forming second protrusions at a first end of a first side of each horizontal part and at a second end of a second side of each horizontal part.

11. The method according to claim 10, wherein the first and second protrusions substantially have a triangle shape.

* * * * *